Jan. 3, 1961     J. BALFOUR     2,966,728

METHOD OF MAKING PRESSURE WELDED EXPANDED PASSAGEWAY PANELS

Filed March 16, 1956

INVENTOR.
JOSEPH BALFOUR

BY *Arthur Robert*

ATTORNEY

United States Patent Office 2,966,728
Patented Jan. 3, 1961

2,966,728

METHOD OF MAKING PRESSURE WELDED EXPANDED PASSAGEWAY PANELS

Joseph Balfour, Louisville, Ky., assignor to Reynolds Metals Company, Louisville, Ky., a corporation of Delaware Filed Mar. 16, 1956, Ser. No. 572,029

3 Claims. (Cl. 29—157.3)

This invention relates to the art of making pressure welded expanded passageway panels.

It has been proposed to "roll bond" three foreshortened metal sheets, with a foreshortened stop-weld pattern of appropriate design interposed between the center sheet and each of the outside sheets, into a relatively elongate unexpanded panel and then expanded the unbonded portions on each side of the center sheet either simultaneously or successively by the application of fluid pressure to form a system of internal passageways on each side of the center sheet. The successive expansion of these systems is undesirable because it often results in the expansion of one system to a greater or lesser degree than the other system when uniform expansion may be highly desirable and in the deformation of the center sheet in an undesirable way. The simultaneous expansion of both systems is less subject to these objections and various provisions have heretofore been made for carrying it out.

The principal object of the present invention is to provide an extremely simple way for and means of carrying out the simultaneous and uniform expansion of both passageway systems.

Another object of this invention is to provide a method of manufacturing pressure welded expanded passageway panels having a plurality of isolated passageway systems.

Briefly, these objects of invention can be obtained by assembling three foreshortened metal sheets in superposed fact-to-face relationship with a foreshortened passageway system pattern of weld resist or stop-weld material interposed between each face of the center sheet and the adjacent face of each adjacent outer sheet and further providing the center sheet with a hole extending between the patterns on its opposite faces. This assembly is pressure welded to form a relatively elongated panel having a pattern of unbonded internal portions on each side of the center sheet corresponding to the passageway systems to be formed. These systems are then formed by the introduction of a fluid under pressure into one of the unbonded portions thereby simultaneously and uniformly expanding both systems of unbonded portions into corresponding passageway systems. If the plurality of expanded passageway systems are designed to be intercommunicating during the use of the tube panel, such openings in the center or intermediate sheet can remain in the finished product; however, if the plurality of passageway systems are designed to be isolated in the finished product, the opening in the intermediate sheet can then be positioned outside the finished area of the panel in an excess panel portion which can be removed from the finished panel by trimming after the completion of the passageway expansion step of the manufacturing process.

Further objects and advantages of the invention will be apparent from the following description taken in conjunction with the drawings wherein.

Figures 1, 2, 3, 4, 5:
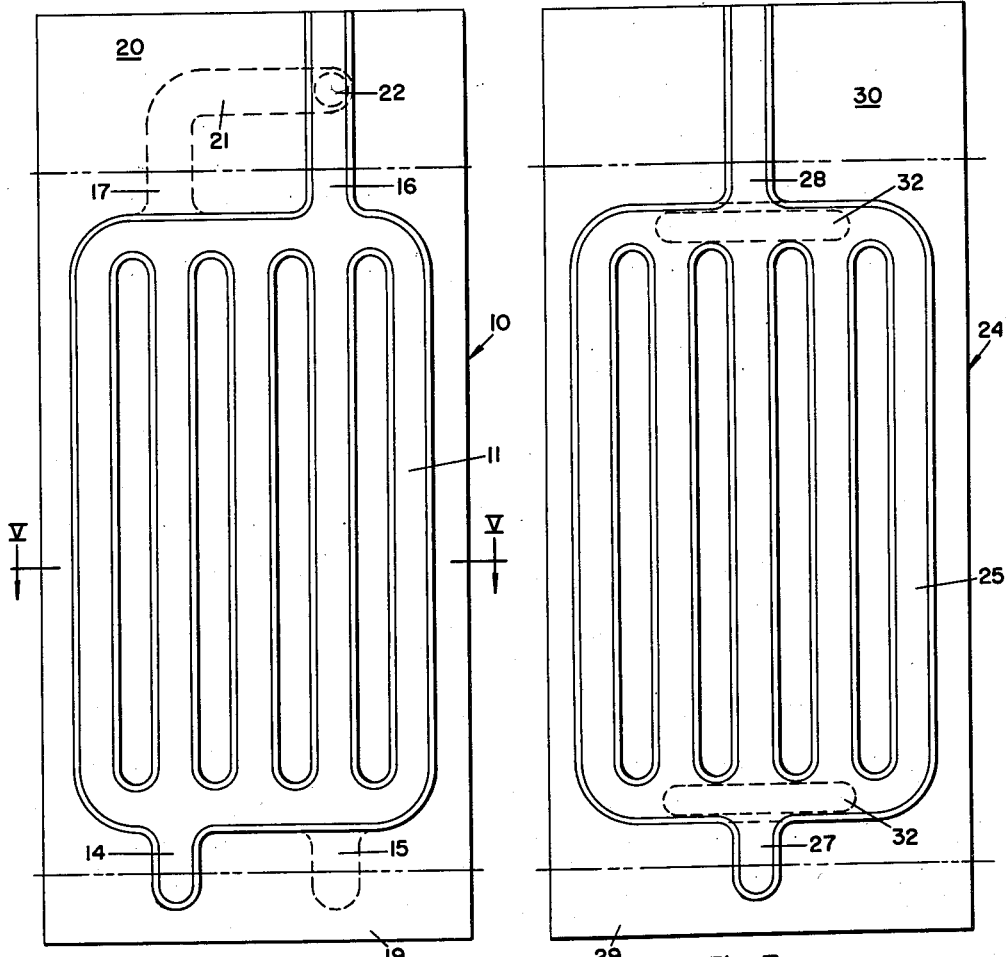
Fig. 1 is a face view of a pressure expanded passageway panel prior to the trimming step of its manufacture.
Fig. 2 is a lower edge view of Fig. 1 after trimming.
Fig. 3 is a face view of a modified pressure expanded passageway panel prior to the trimming step of its manufacture.
Fig. 4 is a lower edge view of Fig. 3 after trimming.
Fig. 5 is a section of Fig. 1 taken on lines 5—5.

The pressure welded and expanded passageway panel 10, illustrated in Fig. 1, is integrally formed from three separate foreshortened sheets of metal such as aluminum preferably by the roll bonding process disclosed in the Long Patent No. 2,662,273. In this method, two or more foreshortened sheets, with a foreshortened pattern of stop-weld or weld resist material interposed therebetween, are pressure welded and elongated by a hot roll reducing operation and then expanded between flat-faced dies by introducing a fluid under appropriate pressure into the between sheet space formed by their unbonded portions. Panels so formed can be used for heat exchange purposes as one example of use.

As a pair of sheets can be bonded together to form a single passageway system, three or more sheets can be integrally bonded to form a panel having a plurality of passageway systems such as is disclosed in this application.

The pressure welded expanded passageway panel 10 of Fig. 1 has fluid passageway systems 11 and 12, the passageway system 12 being positioned on the underside of the panel of Fig. 1 as disclosed in Figs. 2 and 5. The systems 11 and 12 are separated by an intermediate sheet 13 which is integrally bonded with the outer sheets of the panel when finished. The systems 11 and 12 further have pairs of access ports 14, 15, 16 and 17 at both ends of the panel which are formed along with the passageway systems during the manufacturing operation. It should be noted that the access ports, at corresponding ends of the systems, are not positioned directly opposite each other.

As illustrated in Fig. 5, the passages forming the systems 11 and 12 of the panel 10 are positioned directly opposite each other and, therefore, the simultaneous expansion of the pair of systems 11 and 12 by an equalized pressure will provide the same expansion pressure on opposite sides of the same portions of the intermediate sheet 13. Previously, one way of doing this has been by applying separate pressure sources to each system. This invention provides a simple method of making the panel 10 with the use of a single pressure source to apply a simultaneous and equalized expanding pressure to both passageway systems which not only overcomes possible deformation of the intermediate sheet 13, but produces uniformly and equally expanded walls in the pair of passageway systems 11 and 12.

The panel 10 is originally formed by the pressure welding step with the excess portions 19 and 20 which are allowed to remain integral with the panel 10 to close the access ports 14, 15 and 17 during the pressure expanding operation. Further, the stop-weld material pattern forming the access port 17 of the lower passageway system 12 is extended through the excess portion 20 by an angular portion 21 to terminate directly opposite the access port 16 of the passageway system 11. Prior to welding the sheets together to form an integral panel, an opening 22 shown by dotted lines in Fig. 1 is formed in the intermediate sheet 13 to communicate between the stop-weld patterns forming the access port 16 and the portion 21 of the passageway systems 11 and 12.

After the welding step of the manufacturing operation is completed, pressure is applied to the panel through the access port 16 thereby simultaneously forming and uniformly expanding the passages of both the systems 11 and 12, the pressure applied to the access port 16 also being applied to the access port 17 through the opening 22.

After the expanding step of the operation is completed, the portions 19 and 20 are trimmed and the passageway panel 10 is ready for use.

A modified passageway panel 24 is illustrated in Figs. 3 and 4 and includes a pair of opposed passageway systems 25 and 26, the system 26 being hidden from view on the underside of the panel 24 of Fig. 3. The passageway systems 25 and 26 are designed to be intercommunicating and, therefore, only two access ports are necessary. Consequently, the access ports 27 and 28 are formed, respectively, on the lower and upper ends of the panel 24 which is further provided with the excess portions 29 and 30 at either end. These portions 29 and 30 remain integral with the panel until after the pressure expanding step. The excess portion 29 closes the access port 27 during the pressure expanding operation.

An intermediate sheet 31 similar to the sheet 13 of the embodiment of Fig. 1 separates the passageway systems 25 and 26. As these systems are intercommunicating in the finished panel, openings can be positioned in the intermediate sheet 31 within the area of the finished panel to communicate between the systems 25 and 26, these intercommunicating openings being shown at 32 in dotted lines in Fig. 3.

As the passages forming the passageway systems 25 and 26 are also directly opposite each other in this embodiment, the simultaneous expansion of both systems is desirable. Although Fig. 5 is a section of Fig. 1, an intermediate transverse section of Fig. 3 would be identical. A single source of pressure is, therefore, applied to the access port 28 for simultaneously and equally expanding the passageway systems 25 and 26. During this expanding operation, the pressure on both sides of the intermediate sheet 31 will be equal and, therefore, no deformation of the intermediate sheet 31 will be produced. The excess portions 29 and 30 will be trimmed after the expanding step, thereby providing a panel 24 with a pair of communicating passageway systems 25, 26 with an access port 27, 28 at each end.

By this method, panels having two or more passageway systems can be simultaneously and equally expanded in a single manufacturing operation while using a single pressure source, thereby eliminating the necessity of using a plurality of pressure sources or the requirement of a plurality of pressure expanding steps.

It will be obvious to those skilled in the art that various changes may be made in the invention without departing from the spirit and scope thereof and, therefore, the invention is not limited by that which is shown in the drawings and described in the specification, but only as indicated in the accompanying claims.

Having described my invention, I claim:

1. A method of making a pressure welded passageway panel comprising: assembling at least three foreshortened ductile metal sheets in superposed face-to-face relationship with a foreshortened weld resist passageway system pattern interposed between each face of the center sheet and the adjacent face of each adjacent outer sheet, both of said patterns being isolated from the edges of the composite panel formed of said sheets except for a single inlet portion included in one pattern and extending to an edge of the composite panel; providing the center sheet with a hole spaced from the marginal edges of said center sheet and extending from one pattern to the other; pressure welding said sheets to form a relatively elongate unexpanded panel having a system of unbonded portions on each face of the center sheet corresponding to the passageway system to be formed on that face, a hole in the center sheet extending between both systems and covered at its opposite ends by said outer sheets, and a single inlet included in one system extending to a marginal edge of said panel; and introducing a fluid under pressure through the inlet of said one system of unbonded portions to simultaneously and uniformly expand both systems of unbonded portions into corresponding passageway systems.

2. The method of claim 1 whereby: said three foreshortened metal sheets are selected to form a panel with an excess portion on one edge after welding; extending said weld resist patterns into the areas of said sheets forming said excess portions; positioning said hole within the areas of said sheets forming said excess portion; and after the expansion of the passageway systems, trimming the excess portion from the panel thereby leaving a panel having a plurality of isolated passageway systems.

3. The method of claim 1 whereby said assembly step comprises: selecting substantially identical patterns and locating these patterns on the opposite faces of said center sheet substantially directly opposite each other.

References Cited in the file of this patent

UNITED STATES PATENTS

| | | |
|---|---|---|
| 2,662,273 | Long | Dec. 15, 1953 |
| 2,756,487 | Heidorn | July 31, 1956 |
| 2,759,246 | Campbell | Aug. 21, 1956 |
| 2,766,514 | Adams | Oct. 16, 1956 |

FOREIGN PATENTS

| | | |
|---|---|---|
| 747,064 | Great Britain | Mar. 28, 1956 |